(12) United States Patent
Awad et al.

(10) Patent No.: US 9,584,210 B2
(45) Date of Patent: Feb. 28, 2017

(54) RELAY COMMUNICATION SYSTEM

(75) Inventors: Yassin Aden Awad, Tokyo (JP);
Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

(21) Appl. No.: 13/521,437

(22) PCT Filed: Jan. 12, 2011

(86) PCT No.: PCT/JP2011/050789
§ 371 (c)(1),
(2), (4) Date: Jul. 10, 2012

(87) PCT Pub. No.: WO2011/087136
PCT Pub. Date: Jul. 21, 2011

(65) Prior Publication Data
US 2012/0294225 A1    Nov. 22, 2012

(30) Foreign Application Priority Data
Jan. 12, 2010    (GB) .................................. 1000449.7

(51) Int. Cl.
*H04B 7/12* (2006.01)
*H04B 7/155* (2006.01)

(52) U.S. Cl.
CPC ............ *H04B 7/12* (2013.01); *H04B 7/15528* (2013.01)

(58) Field of Classification Search
CPC ...... H04W 16/10; H04W 16/26; H04W 24/04; H04W 28/18; H04W 72/042; H04W 72/0453; H04W 72/04; H04W 72/0406; H04W 84/045; H04W 84/047; H04L 5/0053; H04L 5/001; H04L 5/0007; H04L 2001/0097; H04L 1/0038; H04L 1/0071; H04L 1/1861; H04L 1/1854; H04B 7/12; H04B 7/155; H04B 7/2606; H04B 7/15528; H04B 7/15542; H04B 7/15557; H04B 7/2656
USPC ....... 370/252, 279, 315, 328, 329, 330, 341; 455/7, 450
See application file for complete search history.

(56) References Cited

U.S. PATENT DOCUMENTS

| | | | |
|---|---|---|---|
| 8,391,127 B2* | 3/2013 | Chun et al. .................... | 370/203 |
| 8,532,015 B2* | 9/2013 | Che et al. ....................... | 370/315 |
| 8,649,281 B2* | 2/2014 | Nam et al. ..................... | 370/252 |
| 8,670,716 B2* | 3/2014 | Yu et al. ........................ | 455/63.1 |

(Continued)

FOREIGN PATENT DOCUMENTS

| | | |
|---|---|---|
| GB | 2457242 A | 8/2009 |
| JP | 5630620 B2 | 11/2014 |

(Continued)

OTHER PUBLICATIONS

International Search Report in PCT/JP2011/050789 dated May 11, 2011(English Translation Thereof).

(Continued)

*Primary Examiner* — Michael Thier
*Assistant Examiner* — Eric Nowlin
(74) *Attorney, Agent, or Firm* — Sughrue Mion, PLLC

(57) ABSTRACT

A relay communications system is described in which a base station is able to support both Frequency diversity R-PD-CCH transmission and Frequency selective R-PDCCH transmission either within different cells, or within the same cell but not the same sub-frame or within the same cell and within the same sub-frame.

14 Claims, 8 Drawing Sheets

(56) References Cited

U.S. PATENT DOCUMENTS

| | | | |
|---|---|---|---|
| 8,724,648 B2 * | 5/2014 | Zeng et al. | 370/436 |
| 8,774,081 B2 * | 7/2014 | Park | H04B 7/155 370/315 |
| 8,861,424 B2 * | 10/2014 | Chen et al. | 370/315 |
| 8,964,626 B2 | 2/2015 | Seo et al. | |
| 9,014,080 B2 * | 4/2015 | Khandekar et al. | 370/315 |
| 2007/0237254 A1 | 10/2007 | Pi | |
| 2010/0046442 A1 | 2/2010 | Harada et al. | |
| 2010/0214972 A1 * | 8/2010 | Che | H04W 72/0426 370/315 |
| 2010/0232546 A1 * | 9/2010 | Yu et al. | 375/300 |
| 2010/0254301 A1 * | 10/2010 | Blankenship et al. | 370/315 |
| 2010/0312894 A1 | 12/2010 | Awad et al. | |
| 2011/0292865 A1 | 12/2011 | Seo et al. | |
| 2012/0099518 A1 * | 4/2012 | Park | H04B 7/2606 370/315 |
| 2012/0120868 A1 * | 5/2012 | Park | H04B 7/2606 370/315 |
| 2012/0147846 A1 * | 6/2012 | Ho et al. | 370/330 |
| 2012/0213147 A1 * | 8/2012 | Noh | H04L 5/0026 370/315 |
| 2012/0287848 A1 * | 11/2012 | Kim | H04L 5/0094 370/315 |
| 2012/0294225 A1 | 11/2012 | Awad et al. | |
| 2013/0010685 A1 * | 1/2013 | Kim | H03M 13/271 370/315 |
| 2013/0039261 A1 * | 2/2013 | Bi | H04L 5/0053 370/315 |

FOREIGN PATENT DOCUMENTS

| | | |
|---|---|---|
| WO | 2007/148573 A1 | 12/2007 |
| WO | 2009/099151 A1 | 8/2009 |
| WO | WO2009/109079 A1 | 9/2009 |
| WO | 2010090497 A2 | 8/2010 |

OTHER PUBLICATIONS

Samsung: "DL backhaul design for Type 1 relay", 3GPP Draft; R1-094100 DL backhaul design for Type 1 relay, $3^{rd}$ generation Partnership Project(3GPP), Mobile Competence Centre; 650, Route Des Lucioles; F-06921 Sophia-Antipolis Cedex; France; No. Miyazaki; Oct. 12, 2009, Oct. 12, 2009 (Oct. 12, 2009), XP050388574, [retrieved on Oct. 6, 2009].

NEC Group: "Issues on Relay Type 1 control Design", 3GPP Draft; R1-093863 Issues on Relay Type 1 control Design, $3^{rd}$ generation Partnership Project(3GPP), Mobile Competence Centre; 650, Route Des Lucioles; F-06921 Sophia-Antipolis Cedex; France; No. Miyazaki; Oct. 12, 2009, Oct. 12, 2009 (Oct. 12, 2009), XP050388368, [retrieved on Oct. 5, 2009].

Qualcomm Europe: "Backhaul link Design in Support of relaying operation", 3GPP Draft; R1-094228 Backhaul link Design in Support of relaying operation, $3^{rd}$ generation Partnership Project(3GPP), Mobile Competence Centre; 650, Route Des Lucioles; F-06921 Sophia-Antipolis Cedex; France; No. Miyazaki; Oct. 12, 2009, Oct. 12, 2009 (Oct. 12, 2009), XP050388393, [retrieved on Oct. 6, 2009].

Panasonic: "Control Signalling Placement design for Relay Nodes", 3GPP Draft; R1-094517 Control Signalling Placement design for Relay Nodes, $3^{rd}$ generation Partnership Project(3GPP), Mobile Competence Centre; 650, Route Des Lucioles; F-06921 Sophia-Antipolis Cedex; France; No. Jeju; Nov. 9, 2009, Nov. 11, 2009 (Nov. 9, 2009), XP050388937, [retrieved on Nov. 13, 2009].

Panasonic: "Summary of email discussion on Type 1 Relay Backhaul design issues", 3GPP Draft; R1-095088 Summary of email discussion on Type 1 Relay Backhaul design issues, $3^{rd}$ generation Partnership Project(3GPP), Mobile Competence Centre; 650, Route Des Lucioles; F-06921 Sophia-Antipolis Cedex; France; No. Jeju; Nov. 9, 2009, Nov. 11, 2009 (Nov. 9, 2009).

"Type 1 Backhaul link", 3GPP Draft; R1-092969 Type 1 Backhaul link, $3^{rd}$ generation Partnership Project(3GPP), Mobile Competence Centre; 650, Route Des Lucioles; F-06921 Sophia-Antipolis Cedex; France; No. Los Angeles; Jun. 29, 2009, Jun. 29, 2009 (Jun. 29, 2009).

"Text Proposal on backhaul resource assignment", 3GPP Draft; R1-092249 Text Proposal on backhaul resource assignment, $3^{rd}$ generation Partnership Project(3GPP), Mobile Competence Centre; 650, Route Des Lucioles; F-06921 Sophia-Antipolis Cedex; France; No. San Francisco; May 4, 2009, May 4, 2009 (May 4, 2009).

NEC Group: "Control Structure for *Relay Type 1 nodes*", 3GPP Draft; R1-092965 Control Structure for *Relay Type 1 nodes*, $3^{rd}$ generation Partnership Project(3GPP), Mobile Competence Centre; 650, Route Des Lucioles; F-06921 Sophia-Antipolis Cedex; France; No. Los Angeles; Jun. 29, 2009, Jun. 29, 2009 (Jun. 29, 2009).

3GPP TS 36.211, V8.6.0. (Mar. 2009),Technical Specification, $3^{rd}$ Generation Partnership Project; Technical Specification Group Radio Access Network; Evolved Universal Terrestrial Radio Access (E-UTRA); Physical Channels and Modulation ( Release 8).

3GPP TS 36.212, V8.6.0. (Mar. 2009),Technical Specification, $3^{rd}$ Generation Partnership Project; Technical Specification Group Radio Access Network; Evolved Universal Terrestrial Radio Access (E-UTRA); Multiplexing and channel coding ( Release 8).

3GPP TS 36.213, V8.6.0. (Mar. 2009),Technical Specification, $3^{rd}$ Generation Partnership Project; Technical Specification Group Radio Access Network; Evolved Universal Terrestrial Radio Access (E-UTRA); Physical layers procedures ( Release 8).

3GPP TR 36.814, V1.5.0. (Nov. 2009),Technical Specification, $3^{rd}$ Generation Partnership Project; Technical Specification Group Radio Access Network; Further Advancements for E-UTRA Physical Layer Aspects ( Release 9).

Communication dated May 7, 2015 from the Japanese Patent Office in counterpart application No. 2014-206366.

NEC Group, "Supporting frequency diversity and frequency selective R-PDCCH transmissions", 3GPP R1-100310, (Jan. 22, 2010).

Nokia et al., "Considerations on alternative ways of implementing DCI formats for LTE-Advanced", 3GPP R1-100320, (Jan. 22, 2010).

Samsung, "R-PDCCH multiplexing and search space", 3GPP TSG RAN WG1 Meeting #59, Nov. 9-13, 2009, R1-094593, total 4 pages.

Communication dated Aug. 17, 2016 from the Japanese Patent Office in counterpart Application No. 2015-239336.

Communication dated Dec. 14, 2016 from the Japanese Patent Office in counterpart application No. 2014-206366.

* cited by examiner b) Frequency selective RPDCCH transmission a) Frequency diversity RPDCCH transmission

RELAY COMMUNICATION SYSTEM

TECHNICAL FIELD

The present invention relates to a communication system and to components thereof for providing relay services to mobile or fixed communication devices. The invention has particular but not exclusive relevance to relay services used in LTE-Advanced as currently defined in 3GPP standards documentation TR 36.814 V1.5.0.

BACKGROUND ART

Relaying is considered for LTE-Advanced as a tool to improve, for example, the coverage of high data rates for User Equipment (UE), group mobility, temporary network deployment, the cell edge throughput and/or to provide coverage in new cell areas. The relay node is wirelessly connected to the radio-access network via a donor cell. With respect to the relay node's usage of spectrum, its operation can be classified into:

inband, in which case the base station-to-relay link shares the same carrier frequency with relay-to-UE links. Rel-8 UEs (see 3GPP specifications TS 36.211 V8.6.0, TS 36.212 V8.6.0 and TS 36.213 V8.6.0) should be able to connect to the donor cell in this case.

outband, in which case the base station-to-relay link does not operate in the same carrier frequency as relay-to-UE links.

A Type 1 relay is an inband relay that controls cells of its own. The relay controls one or several cells and a unique physical-layer cell identity is provided in each of the cells controlled by the relay. The same RRM (Radio Resource Management) mechanisms are available and from a UE perspective there is no difference in accessing cells controlled by a relay and cells controlled by a "normal" eNodeB (LTE base station). The cells controlled by the relay should support also LTE Rel-8 (legacy) UEs.

For inband relaying, the eNodeB-to-relay link operates in the same frequency spectrum as the relay-to-UE link. Due to the relay transmitter causing interference to its own receiver, simultaneous eNodeB-to-relay and relay-to-UE transmissions on the same frequency resource may not be feasible unless sufficient isolation of the outgoing and incoming signals is provided e.g. by means of specific, well separated and well isolated antenna structures. Similarly, at the relay it may not be possible to receive UE transmissions simultaneously with the relay transmitting to the eNodeB.

One possibility to handle the interference problem is to operate the relay such that the relay is not transmitting to UEs when it is supposed to receive data from the donor eNodeB, i.e. to create "gaps" in the relay-to-UE transmission. These "gaps" during which UEs (including Rel-8 UEs) are not supposed to expect any relay transmission can be created by configuring MBSFN (Multi-media Broadcast over a Single Frequency Network) sub-frames. Similarly, Relay-to-eNodeB transmissions can be facilitated by not allowing any UE-to-relay transmissions in some sub-frames. However, the use of the MBSFN sub-frame introduces some design restrictions for the relay control structure as the relay can not read the PDCCH (Physical Downlink Control Channel) of the donor cell. Hence a new control channel (R-PDCCH) is required solely for the relay stations.

Various issues surrounding the new relay node control channel have been discussed since the last RAN1#58B meeting held from the $12^{th}$ to the $16^{th}$ of Oct. 2009. Some of the open issues include R-PDCCH multiplexing including Interleaving; R-PDCCH placement in the frequency domain; and R-PDCCH region size in the time domain.

SUMMARY

The inventors believe that early deployments of LTE-Advanced Release 10 will be mainly based on fixed relay nodes and that in later deployments mobile relay nodes will also be used. Therefore, the inventors consider it important to clarify the necessity of supporting both frequency diversity R-PDCCH transmission for mobile relay nodes and frequency selective R-PDCCH transmissions for fixed relay nodes in the backhaul sub-frame to the donor base station and their impact on the choice of the open issues discussed above.

The present application discusses these issues and ways of supporting both frequency diversity and frequency selective R-PDCCH transmissions with the same donor base station.

According to one aspect, the present invention provides a communications station operable to communicate with a number of communications devices, including a number of relay stations, wherein the communications station is operable to transmit a sequence of sub-frames, and transmits relay control data for different relay stations using both frequency selective transmission and frequency diversity transmission in the same sub-frame. It can do this by frequency division multiplexing the frequency selective transmission and the frequency diversity transmission.

In one embodiment, the communications station transmits respective configuration data in advance to each relay station, identifying if the relay station is to monitor frequency selective transmissions or frequency diversity transmissions. The configuration data may include data defining one or more subsets of Physical Resource Blocks that may carry the control data. Different subsets may be defined for different groups of relay stations within the cell. Different subsets may also be defined for FD relays and for FS relays.

For frequency diversity transmission, the communications station transmits relay control data for a first subset of said relay stations on plural Physical Resource Blocks, such that the relay control data for the relay stations in said first subset are carried on the same Physical Resource Blocks in an interleaved manner. For frequency selective transmission, the communications station transmits relay control data for a second subset of said relay stations on a respective plurality of Physical Resource Blocks, such that the relay control data for each relay station in said second subset is carried on a respective different Physical Resource Block. Separate Physical Resource Blocks are used to carry the frequency selective transmission and the frequency diversity transmission.

The communications station may also transmit relay control data for different groups of relay stations in different sub-frames. In this way, the communications station can share the resources between a plurality of relay stations in a time division way as well. This is useful when there are many relay stations in the same cell.

According to another aspect, the present invention provides a communications station comprising: a communications controller that generates a sub-frame comprising an initial part including control data and a subsequent part including user data for devices served by the communications station; and a transceiver operable to use communications resources to transmit the generated sub-frame for receipt by the devices served by the communications station; wherein the communications controller includes relay control data for a plurality of relay stations served by the communications station within the subsequent part of the generated sub-frame; wherein the communications controller transmits relay control data for different relay stations using both a frequency selective transmission and a frequency diversity transmission in the same sub-frame of the cell.

According to another aspect, the present invention provides a relay station operable to communicate with a remote communications device that communicates using a communication cell, wherein the relay station receives, within the cell, a sequence of sub-frames, wherein at least one sub-frame includes relay control data for different relay stations using a frequency selective transmission and a frequency diversity transmission; wherein the relay station is operable to receive configuration data identifying if its relay control data will be transmitted using frequency diversity transmission or configuration data identifying if its relay control data will be transmitted using frequency selective transmission and wherein the relay station is operable to use the received configuration data to recover its relay control data from the at least one sub-frame.

The relay station may receive the configuration data in advance of receiving the at least one sub-frame and may use the received configuration data to recover its relay control data from plural sub-frames until the relay station receives new configuration data. In this way, the relay station can be semi-statically assigned (in other words it can be changed at a later time point if desired) to receive its relay control data on a frequency selective transmission or on a frequency diversity transmission.

The configuration data may identify a plurality of Physical Resource Blocks that are used for carrying relay control data and the relay station can attempt a plurality of blind decodings of the Physical Resource Blocks identified by the configuration data, in order to find out the actual Physical Resource Blocks used to carry the control data for the relay station. The configuration data may include data defining a plurality of subsets of Physical Resource Blocks that are used for carrying relay control data and the relay station may limit the number of blind decodings that it performs using the data defining the plurality of subsets.

The relay station may receive a plurality of sub-frames and may perform blind decodings on predetermined Physical Resource Blocks of each sub-frame to identify if the sub-frame includes control data for the relay station. If the relay station is unable to decode any of the predetermined Physical Resource Blocks of a sub-frame, then the sub-frame does not include any data for the relay station; and if the relay station is able to decode one or more of the Physical Resource Blocks to recover the relay control data, then the relay station uses the relay control data to identify resources used within the sub-frame that carries other data for the relay station and is operable to recover this other relay data from the identified resources.

According to another aspect, the present invention provides a communications station operable to communicate with a number of communications devices, including a number of relay stations, wherein the communications device transmits a sequence of sub-frames in a communications cell, and transmits relay control data for different relay stations only using a frequency selective transmission in some sub-frames of the cell and transmits relay control data for different relay stations only using a frequency diversity transmission in other sub-frames of the cell.

According to another aspect, the present invention provides a relay station that communicates with a remote communications device using a communications cell, wherein the relay station receives, within the cell, a sequence of sub-frames, wherein some sub-frames include relay control data for different relay stations only using a frequency selective transmission and other sub-frames include relay control data for different relay stations only using a frequency diversity transmission; wherein the relay station receives configuration data identifying if its relay control data will be transmitted in a sub-frame that uses frequency diversity transmission or configuration data identifying if its relay control data will be transmitted in a sub-frame that uses frequency selective transmission and wherein the relay station is operable to use the received configuration data to recover its relay control data from the corresponding sub-frame.

According to another aspect, the present invention provides a communications station that communicates with a number of communications devices, including a number of relay stations, using plurality of communication cells, wherein the communications device transmits, in at least one of said cells, relay control data for different relay stations only using a frequency selective transmission and transmits, in at least one other of said communications cells, relay control data for different relay stations only using a frequency diversity transmission.

The invention also provides corresponding methods and computer software products that may be provided on a carrier signal or on a recording medium.

BRIEF DESCRIPTION OF THE DRAWINGS

These and other features and aspects of the invention will be apparent from the following embodiments of the invention which are described by way of example only with reference to the attached figures in which.

DETAILED DESCRIPTION OF EXEMPLARY EMBODIMENTS

Overview

Figure 1:
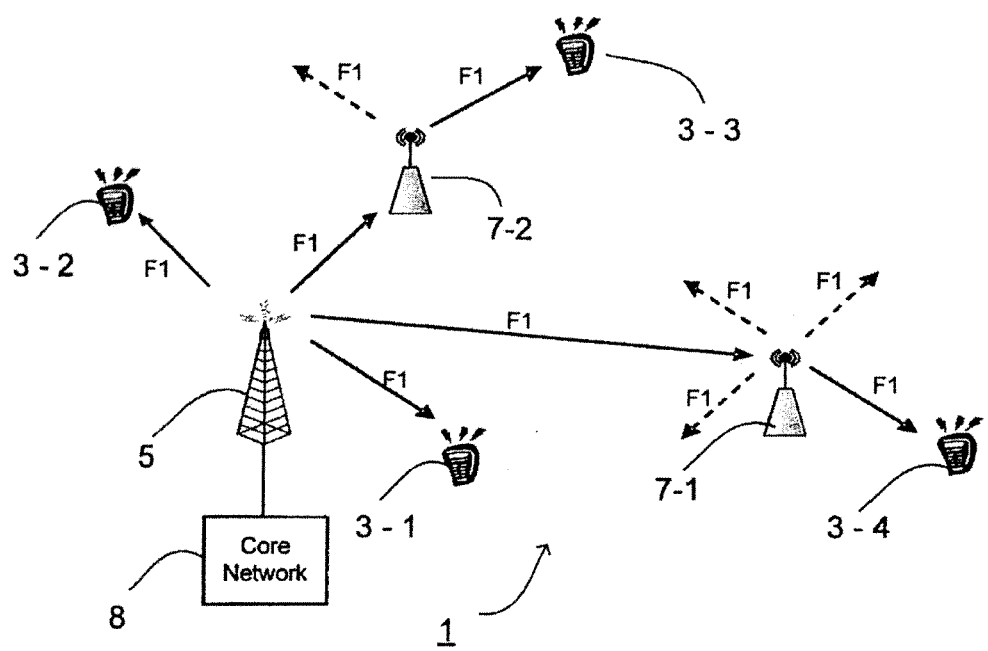
FIG. 1 schematically illustrates a mobile telecommunication system of a type to which the described embodiments are applicable.

FIG. 1 schematically illustrates a mobile (cellular) telecommunication system 1 in which users of mobile telephones 3-1, 3-2, 3-3 and 3-4 can communicate with other users (not shown) via a base station 5 or relay stations 7-1 and 7-2 and a telephone network 8. As shown in FIG. 1, the base station 5 is directly connected to the core network 8 and so mobile telephones 3-1 and 3-2 directly connected with the base station 5 (hereafter referred to as Direct MTs) communicate in the normal fashion. However, the relay stations 7 are only connected to the core network 8 via the base station 5. Therefore, communications to or from mobile telephones 3-3 and 3-4 that are connected to a relay station 7 (hereafter referred to as Relay MTs) must be transmitted over the air interface between them and the relay station 7 and over the air interface between the relay station 7 and the base station 5. As illustrated in FIG. 1 (by use of the label $F_1$), in this embodiment, the base station 5 and the relay stations 7 transmit downlink data in the same frequency band. In order to avoid interference, the relay stations 7 do not receive data from the base station 5 when they are transmitting data to the Relay MTs 3 that they are serving. Similarly, in the uplink the relay stations 7 do not transmit data to the base station 5 at the same time that they receive data from the Relay MTs 3 that they are serving.

As will be described in more detail below, the present embodiment describes a number of different ways that control data for the relay stations 7 can be signalled from the base station 5 to the relay stations 7, whilst maintaining the general sub-frame structure agreed for LTE Rel 8 (and therefore backwards compatibility with legacy (Rel' 8) mobile telephones).

LTE Sub-Frame Data Structure

Before discussing the specific ways in which control data for the relay stations 7 is transmitted from the base station 5, a description will be given of the access scheme and a general frame structure agreed for LTE Rel 8. An Orthogonal Frequency Division Multiple Access (OFDMA) technique is used for the downlink to allow the Direct MTs (3-1 and 3-2) and the relay stations 7 to receive data over the air interface with the base station 5 and to allow the Relay MTs (3-3 and 3-4) to receive data over the air interface with the relay station 7. Different sub-carriers are allocated by the base station 5 (for a predetermined amount of time) to each Direct MT 3 and the relay stations 7 depending on the amount of data to be sent to the mobile telephone 3 or the relay stations 7. These are referred to as physical resource blocks (PRBs) in the LTE specifications. PRBs thus have a time and frequency dimension. Similarly, different subcarriers are allocated by the relay station 7 (for a predetermined amount of time) to each Relay MT, depending on the amount of data to be sent to the Relay MT. To do this, the base station 5 (and the relay station 7) dynamically allocates PRBs for each device that it is serving and signals the allocations for each sub-frame (TTI) to each of the scheduled devices in a control channel.

Figure 2A:
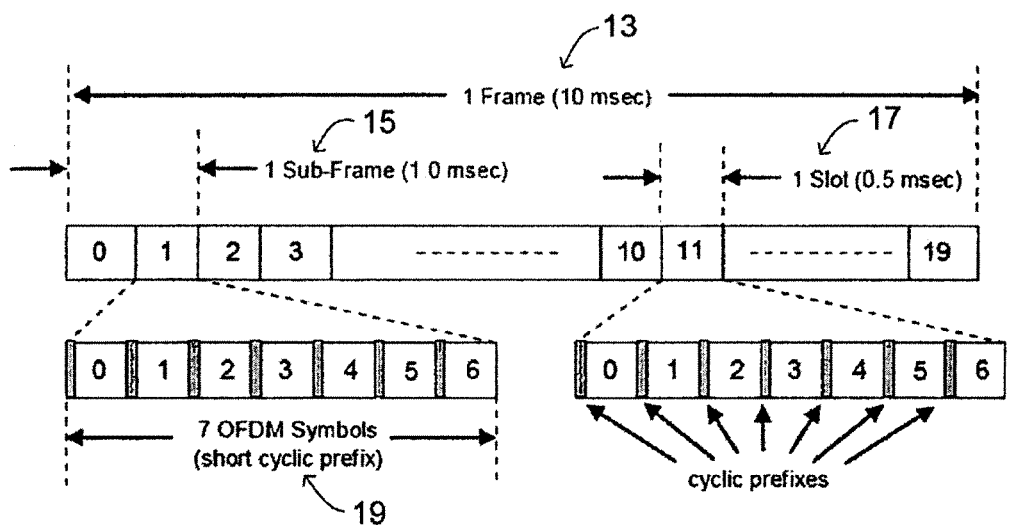
FIG. 2a schematically illustrates a generic frame structure used in communications over the wireless links of the system shown in FIG. 1.
Figure 2B:
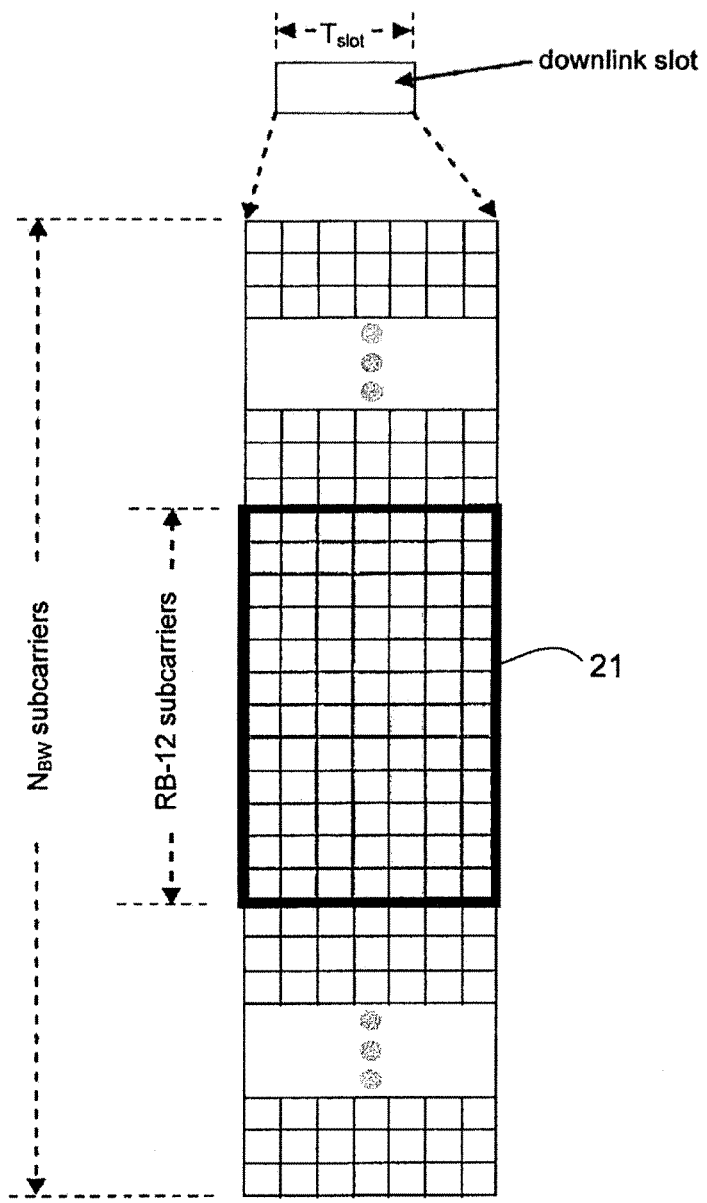
FIG. 2b schematically illustrates the way in which the frequency subcarriers are divided into resource blocks and the way that a time slot is divided into a number of OFDM symbols.

FIG. 2a illustrates a generic frame structure agreed for LTE Rel 8 communications over the air interface with the base station 5. As shown, one frame 13 is 10 msec long and comprises 10 sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17. A PRB over two slots is also defined by the LTE Rel' 8 specifications as being the smallest element of resource allocation assigned by the base station scheduler. The transmitted downlink signal comprises $N_{BW}$ subcarriers for a duration of $N_{symb}$ OFDM symbols. It can be represented by a resource grid as illustrated in FIG. 2b. Each box in the grid represents a single sub-carrier for one symbol period and is referred to as a resource element. As shown, each PRB 21 is formed from 12 consecutive sub-carriers and (in this case) seven symbols for each subcarrier; although in practice the same allocations are made in the second slot 17 of each sub-frame 15 as well.

MBSFN Frame Structure for Relaying

It has already been proposed to use MBSFN sub-frames 15 to support relaying, as these are already defined for multicast channels in LTE Rel 8 and thus provide backwards compatibility. Based on the LTE Rel 8 structure, sub-frames 0, 4, 5, 9 in FDD and 0, 1, 5, 6 in TDD cannot be used for MBSFN sub-frames, but some or all of the remaining sub-frames 15 can be signalled as MBSFN sub-frames 15.

Figure 3:
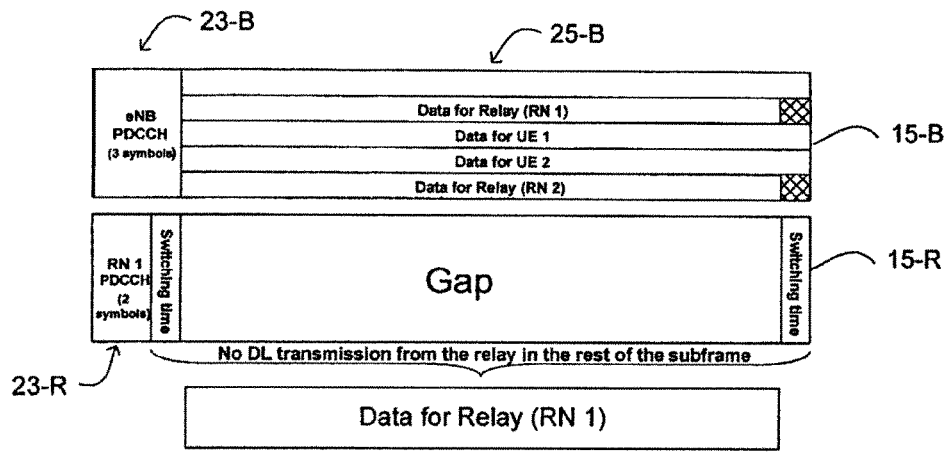
FIG. 3 shows a base station sub-frame and a relay station sub-frame and illustrates a problem caused when the two sub-frames are time synchronised.

FIG. 3 illustrates the MBSFN sub-frame structure 15-B of the base station 5 and the MBSFN sub-frame structure 15-R of the relay station 7 and illustrates the way in which gaps are provided in the relay station's sub-frame structure 15-R to provide appropriate communication opportunities for communications with the base station 5. As illustrated in FIG. 3, in this embodiment, the base station 5 and the relay station 7 are arranged so that their MBSFN sub-frames are time synchronised. At the start of each base station MBSFN sub-frame 15-B, the base station 5 transmits a PDCCH 23-B (Physical Downlink Control Channel) over the first three symbols.

The control data normally sent by the base station 5 in the PDCCH 23 of each sub-frame 5 includes:
1) the Physical Control Format Indicator Channel (PC-FICH) which informs the relay stations 7 of the size of the PDCCH in terms of the number of resource blocks in the frequency domain;
2) the PHICH which carries the hybrid-ARQ ACK/NAK data; and
3) the PDCCH which contains all the information required by the receiving device to decode the downlink transmission in the same sub-frame 15 (resource allocation, modulation scheme TB size etc) and data identifying where and how to transmit in the uplink in the next TTI (frame) 13.

The remaining symbols in the sub-frame 15-B form the PDSCH 25-B (Physical Downlink Shared CHannel) and are used to carry downlink user data for the Direct MTs 3-1 and 3-2 and for the relay stations 7 being served by the base station 5. At the start of a "gap" relay station MBSFN sub-frame 15-R, the relay stations 7 transmit a PDCCH 23-R over the first two symbols before switching to listen and receive data from the base station 5. Relay MTs 3-2 and 3-4 will receive the relay PDCCH 23-R data transmitted over the first two symbols and will see that no data is scheduled for transmission to them in that sub-frame 15 and so will go to sleep until the start of the next sub-frame 15. During this time, the relay stations 7 will receive the downlink data from in the PDSCH 25-B of the base station MBSFN sub-frame 3.

As those skilled in the art will appreciate, with frame synchronisation between the base station 5 and the relay stations 7, the relay stations 7 cannot receive the PDCCH 23-B transmitted by the base station 5—as they are transmitting their own PDCCH control data 23-R at the same time. Therefore, the control data for each relay station 7 (i.e. R-PDCCH) has to be included in the PDSCH 25-B portion of the MBSFN sub-frame 15-B transmitted by the base station 5. With the above frame structure, therefore, the data to be transmitted in the shared data channel 25-B includes the R-PDCCH and the normal PDSCH for the Direct MTs 3 served by the base station 5. There are various ways that this data can be multiplexed together within the PDSCH 25-B and some of these and the issues surrounding them will now be described.

R-PDCCH Multiplexing Issues

Figure 4A:
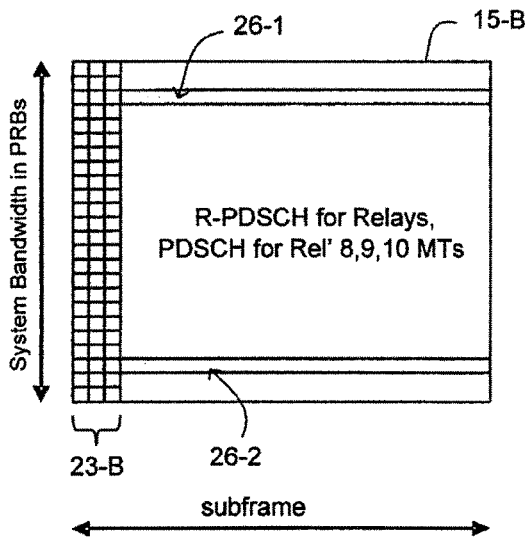
FIG. 4a illustrates one way in which relay nodes can receive R-PDCCH control data from the base station by using Frequency Division Multiplexing.
Figure 4B:
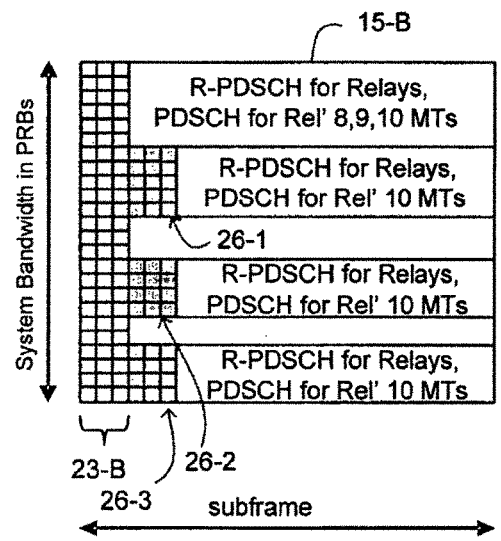
FIG. 4b illustrates another way in which relay nodes can receive R-PDCCH control data from the base station by using a Hybrid Time Division Multiplexing and Frequency Division Multiplexing.

Two viable multiplexing solutions for R-PDCCH and R-PDSCH/PDSCH channels are pure FDM (Frequency Division Multiplex) and Hybrid TDM (Time Division Multiplex)+FDM schemes. FIG. 4 illustrates examples of these two multiplexing schemes. In particular, FIG. 4*a* illustrates the way in which R-PDCCH control data 26-1 and 26-2 for the relay stations 7 are provided in separate PRBs from the R-PDSCH and the PDSCH for direct MTs. FIG. 4*b* illustrates the way in which three separate blocks of R-PDCCH data 26-1, 26-2 and 26-3 are provided on the first three OFDM symbols of some PRBs within the sub-frame, with the remaining OFDM symbols being available for use by R-PDSCH and PDSCH (although only for Rel 10 MTs). For clarity, FIGS. 4*a* and 4*b* do not show the switching time required at the end of the sub-frame. Therefore, where the PRB is carrying data for the relay station, the last OFDM symbol of the sub-frame will not carry relay data (control or user data).

Pure FDM Multiplexing Scheme

As illustrated in FIG. 4*a*, the R-PDCCH 26 resides on only some PRBs within the sub-frame 15-B, starting from the first OFDM symbol of the sub-frame 15-B that the relay station 7 can receive and ending at the second last OFDM symbol of the sub-frame 15-B.

The Advantages of the FDM Multiplexing Scheme Include:
  Power sharing between R-PDCCH and PDSCH is possible.
  It does not require a new definition of how to reuse the resources that are not used for R-PDCCH within the PRBs that are semi-statically assigned for R-PDCCH.

The Disadvantages of the FDM Multiplexing Scheme Include:
  It has a long decoding delay for the R-PDSCH as the R-PDCCH spans to the end of the sub-frame 15-B.

TDM+FDM Multiplexing Scheme

As illustrated in FIG. 4*b*, the R-PDCCH 26 resides on a few OFDM symbols of some PRBs within the sub-frame 15-B.

The Advantages of the TDM+FDM Multiplexing Scheme Include:
  The decoding delay is much better than the FDM scheme as the R-PDCCH is placed in the first slot of the sub-frame 15-B.
  Frequency diversity is better than the FDM scheme because (for a given R-PDCCH data size) the transmission will be spread over more PRBs.

The Disadvantages of the TDM+FDM Multiplexing Scheme Include:
  Power sharing between R-PDCCH and PDSCH is difficult. That is if power boosting is applied to the R-PDCCH OFDM symbols, then the power of all PDSCH OFDM symbols for Rel'8 MTs needs to be reduced as the transmission power should be kept constant during the sub-frame, particularly for higher order modulations. However, this can be dealt with by the proper adjustment of the modulation and coding scheme.
  It requires a new definition of how to reuse the resources that are not used for R-PDCCH within the semi-statically assigned PRBs. More specifically, how Rel' 10 MTs will reuse the remaining portion of the PRBs used for R-PDCCH transmission.

Currently, some of the open issues that have not yet been decided include:
  1) In the TDM+FDM situation, what should be the R-PDCCH region size in the time domain, i.e. how many OFDM symbols should be assigned for the R-PDCCH 26;
  2) For FDM and TDM+FDM where should the R-PDCCH 26 be placed in the frequency domain, i.e. which PRBs should be assigned for the R-PDCCH 26; and
  3) How should the R-PDCCH control data for different relay stations 7 being served by the same base station 5 be interleaved with each other.

With regard to the first issue, the inventors think that the FDM multiplexing scheme is simpler and more flexible than the TDM+FDM scheme as with the FDM scheme there is no region size in the time domain to be determined. The inventors also consider that there is no need to exclude the TDM+FDM multiplexing scheme as the last OFDM symbol used for R-PDCCH in the sub-frame 15-B can be flexibly allocated for R-PDCCH transmission. This can be achieved for example by flexibly allocating the first slot of the sub-frame for R-PDCCH, with the symbols in the second slot being provided for R-PDSCH. Alternatively, the first three or six or eight OFDM symbols (as an example) of the sub-frame can be used to carry the R-PDCCH, with the remaining symbols in the sub-frame being defined for carrying R-PDSCH.

With regard to the second issue, the inventors think that there are three possible options for the frequency placement:
  A) Distributed placement where the R-PDCCH 26 for a particular relay station 7 is distributed on two or more well-separated PRBs which may be shared by more than one relay. This option achieves frequency diversity gain.
  B) Localised placement where the R-PDCCH 26 for a particular relay station 7 is placed on contiguous or very close PRBs which are not shared by other relay stations 7. This option achieves frequency selective gain.
  C) Both distributed and localised placements of the R-PDCCH transmission.

The inventors' preference is that both distributed and localised placements of the R-PDCCH transmission are supported (i.e. option C), and the motivation for this preference will be described below.

As a general point, regardless of whether FDM and/or TDM+FDM multiplexing is chosen, the inventors prefer that semi-statically assigned PRBs for the R-PDCCH are chosen so that they are distributed in the frequency domain to achieve frequency diversity gain and frequency selective gain. Semi-statically assigned PRBs means that the PRBs used for R-PDCCH are defined in advance of the transmission of the sub-frame and known by the base station 5 and the relay stations 7. Each relay station 7 just does not know if it is scheduled in the sub-frame 15 and, if it is, on which of the PRBs their R-PDCCH data is to be found. Normally the semi-statically assigned PRBs will not change, but they can be changed if it turns out that one or more of the assigned PRBs provides poor reception to one or more of the relay stations 7. Whenever the semi-statically assigned PRBs are changed, then all the relay stations 7 will be informed of the change by a suitable control message.

With regard to the third issue, the inventors think that there are three possible options for interleaving the R-PDCCH data for the different relay stations 7:
  a) Full interleaving where all R-PDCCHs for different relay stations 7 are interleaved together in the same base station sub-frame 15-B. The unit size of interleaving can be a resource-element group (REG) (similar to Rel'8 PDCCH interleaving) or a control channel element (CCE).
  b) No interleaving where all R-PDCCHs for different relay stations 7 are not interleaved in the same base station sub-frame 15-B.
  c) Mixed case of interleaving and no-interleaving where some R-PDCCHs for different relay stations 7 are interleaved together and some R-PDCCHs for other relay stations 7 are not interleaved.

The inventors' preference is to support the mixed case of interleaving and no-interleaving (i.e. option c), and the motivation for this preference will be described below.

Frequency Diversity R-PDCCH Transmission

Figures 5A, 5B:
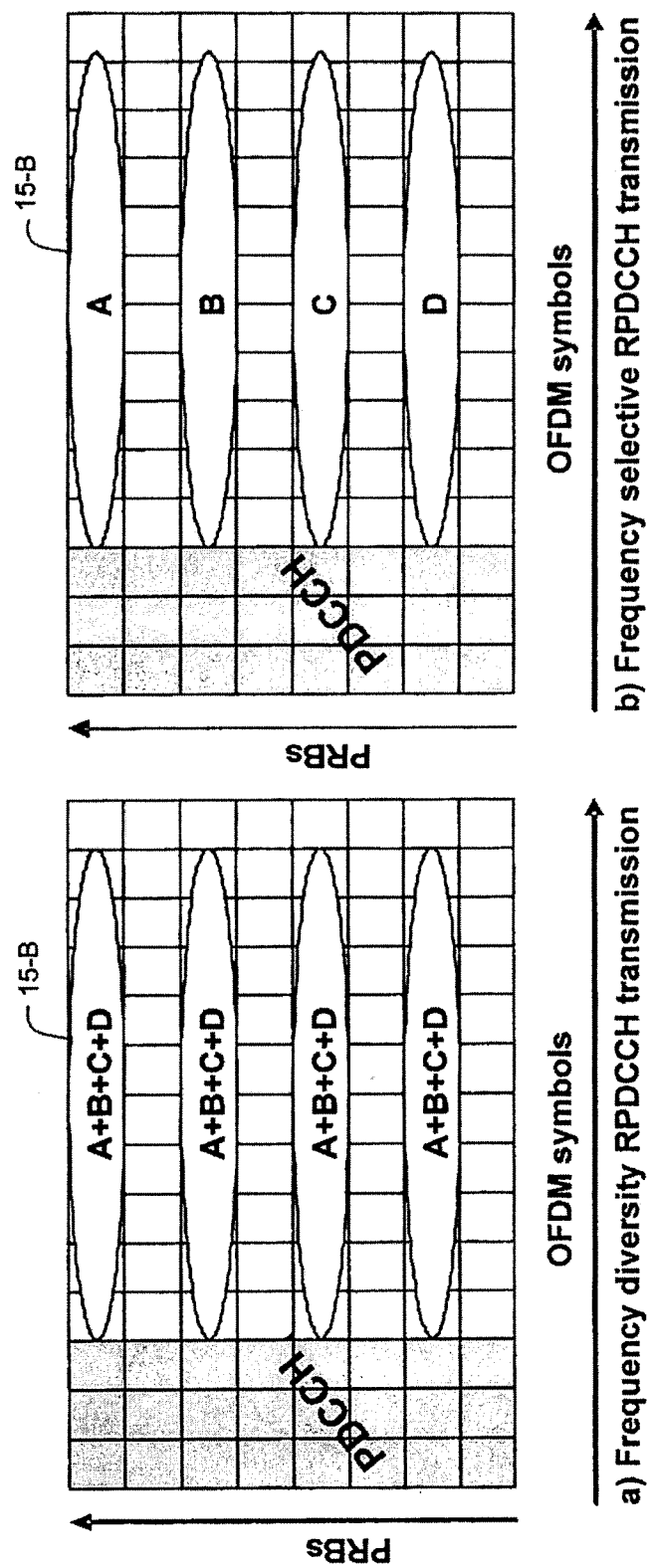
FIG. 5a illustrates one way in which R-PDCCH control data for the relay nodes can be interleaved with each other to achieve frequency diversity gain.
FIG. 5b illustrates another way in which R-PDCCH control data for the relay nodes is placed within the sub-frame to achieve a frequency selective gain.

In Frequency diversity (FD) R-PDCCH transmission, the R-PDCCHs for different relay stations 7 are multiplexed and interleaved and mapped to all or a subset of PRBs that are semi-statically assigned for R-PDCCH transmission. Such a Frequency diversity R-PDCCH scheme is illustrated in FIG. 5a, where A+B+C+D means that this PRB includes interleaved R-PDCCH control data for relay nodes A, B, C and D. This scheme corresponds to selecting option A) for R-PDCCH placement in frequency domain and option a) for Interleaving, described above. The main motivation of this scheme is to achieve robustness against interference and channel fluctuations. This FD R-PDCCH transmission has the following characteristics:
  PRBs semi-statically assigned to R-PDCCH transmission are shared by some or all relays.
  All interleaved resources (PRBs) for FD R-PDCCH transmission are occupied even if the number of Relays is small.
  Precoding/beamforming can't be applied for FD R-PDCCH transmission.
  Allocated PRBs are well-separated (i.e. frequency distributed) to achieve frequency diversity gain.
  Common RS (CRS) can be used to demodulate the FD R-PDCCH.
  Dynamic selection of PRBs (i.e. the number of PRBs and placement in frequency domain) for FD R-PDCCH transmission is possible in each sub-frame.
  This scheme is suitable for both fixed and mobile relays.

Frequency Selective R-PDCCH Transmission

In Frequency selective (FS) R-PDCCH transmission, the R-PDCCHs for different relay stations 7 are multiplexed (but not interleaved) and mapped to all or a subset of semi-statically assigned PRBs for R-PDCCH transmission. Such a Frequency selective R-PDCCH scheme is illustrated in FIG. 5b, where the R-PDCCH control data for the different relay stations (here stations A, B C and D) are transmitted on different PRBs. This scheme corresponds to selecting option B) for R-PDCCH placement in the frequency domain and option b) for Interleaving, described above. With this scheme, the base station 5 transmits the R-PDCCH for each relay station 7 on the PRBs (within the semi-statically assigned PRBs for R-PDCCH transmission) with good channel conditions, which the base station 5 determines from feedback received from the relay stations 7 (e.g. Channel Quality Indicators (CQI), etc.). The motivation of this scheme is to achieve frequency selective gain. This FS R-PDCCH transmission has the following characteristics:
  The PRBs assigned to each relay station 7 are not shared with other relay stations 7.
  The resources (PRBs) not used for FS R-PDCCH transmission can be reused for R-PDSCH and Rel'8/Rel' 10 MT's PDSCH transmission particularly if the number of relay stations is small.
  CQI feedback is used to select the best PRBs from the semi-statically assigned PRBs for FS R-PDCCH transmission.
  Precoding/beamforming can be applied for FS R-PDCCH transmission.
  Common RS (CRS) or Precoded DM-RS can be used to demodulate the FS R-PDCCH.
  Allocated PRBs can be contiguous or separated.
  Dynamic selection of PRBs (i.e. number of PRBs and their placement in the frequency domain) for FS R-PDCCH transmission is possible in each sub-frame.
  This scheme is mainly suitable for fixed relays and mobile relays with low mobility (where the channel conditions are not changing quickly over time).

As mentioned above, the inventors believe that the deployment scenarios at the initial stage of Rel' 10 will be mainly based on fixed relay stations 7, so the Frequency selective (FS) R-PDCCH transmission scheme will have some feasibility.

TABLE 1

Summary of characteristics of FS and FD R-PDCCH transmissions

| Characteristics | Frequency selective R-PDCCH transmission | Frequency diversity R-PDCCH transmission |
| --- | --- | --- |
| One PRB shared by more than one Relay Node (Interleaved together or not) | No | Yes |
| Flexibility for sharing between R-PDCCH and R-PDSCH/Rel'8 UE's PDSCH | High (Pro) | Low (Con) |
| CQI feedback is necessary to select the best PRBs for R-PDCCH transmission | Yes | No |
| R-PDCCH precoding/beamforming is possible | Yes (Pro) | No (Con) |
| Dynamic selection of PRBs for R-PDCCH transmission | Yes | Yes |

TABLE 1-continued

Summary of characteristics of FS and FD R-PDCCH transmissions

| Characteristics | Frequency selective R-PDCCH transmission | Frequency diversity R-PDCCH transmission |
|---|---|---|
| Suitable for | Fixed relays and mobile relays with low mobility (Con) | Both fixed and mobile relays (Pro) |

As discussed above, both FD and FS R-PDCCH transmissions exhibit characteristics that are important for reliable reception of the R-PDCCH for mobile and fixed relays. Therefore, from the Layer L1 perspective, it is preferable that both FD and FS R-PDCCH transmissions are supported at an early stage of the Relay specification development. Therefore, the inventors prefer the option C) for R-PDCCH placement in frequency domain and option c) for Interleaving described above.

Different options will now be discussed for supporting both FD and FS R-PDCCH transmissions with the same donor base station 5.

Option 1:

Frequency diversity R-PDCCH and Frequency selective R-PDCCH transmissions are not supported in the same cell of the donor base station 5, For example, in the low mobility areas or for fixed relays, only Frequency selective R-PDCCH transmission is supported within the corresponding cell and in the high mobility areas, only Frequency diversity R-PDCCH transmission is supported in the corresponding cell. This option has a small impact on the LTE specification. For example, in cell specific mapping, 1 bit can be added in the system information to define whether the cell is FD R-PDCCH or FS R-PDCCH. However, this option provides no flexibility for co-existence of Frequency diversity R-PDCCH and Frequency selective R-PDCCH transmissions in the cell.

Option 2:

Both Frequency diversity R-PDCCH and Frequency selective R-PDCCH transmissions are supported in the same cell, but not in the same sub-frame 15-B. With this option, the base station 5 will apply Time Division Multiplexing into different sub-frames for Frequency diversity and Frequency selective R-PDCCH transmissions. Each relay station 7 will be informed by higher layers, in a semi-static manner (i.e. semi-static signaling from higher layers (RRC/MAC layers)), about which of these two types of R-PDCCH transmissions to monitor. Each relay station 7 will then monitor its R-PDCCH in all the backhaul sub-frames 15-B regardless of whether the sub-frame 15-B carries the Frequency diversity R-PDCCH transmission or the Frequency selective R-PDCCH transmission. If the relay station 7 is not scheduled then the decoding will fail anyway. In this way, the relay station 7 does not need to be told if the sub-frame uses Frequency diversity R-PDCCH transmission or Frequency selective R-PDCCH transmission.

Figure 6:
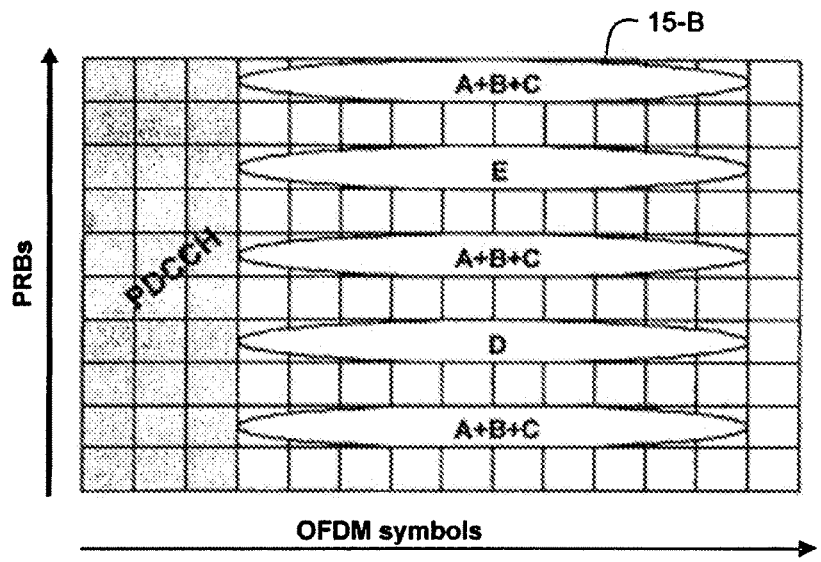
FIG. 6 illustrates the way in which R-PDCCH control data for relay nodes can be sent within the same sub-frame using both Frequency diversity and Frequency selective transmission.

Option 3:

Both Frequency diversity and Frequency selective R-PDCCH transmissions are supported in the same cell and in the same sub-frame 15-B, as shown on FIG. 6. In this option, the base station 5 will use FDM multiplexing in the same sub-frame 15-B (and, depending on the number of relay stations 7, TDM multiplexing into different sub-frames) for Frequency diversity R-PDCCH and Frequency selective R-PDCCH transmissions. Thus, as shown in FIG. 6, the R-PDCCH control data for relay stations A, B and C is transmitted using Frequency diversity R-PDCCH transmission and the R-PDCCH control data for relay stations D ad E is transmitted using Frequency selective R-PDCCH transmission; and Frequency Division Multiplexing is used to separate the two types of transmissions. If the base station 5 is serving other relay stations 7 in the same cell, then it will use TDM multiplexing between different sub-frames 15-B to provide the R-PDCCH for all the served relay stations. With this option, each relay station 7 will be informed from higher layers, in a semi-static manner (i.e. semi-static signaling from higher layers (RRC/MAC)), about which of these two R-PDCCH transmissions to monitor. The relay station 7 will then monitor its R-PDCCH in all the backhaul sub-frames 15-B and if it is not scheduled in the sub-frame 15-B then the decoding will fail anyway.

PRB Determination

In 3GPP standards Specification TR36.814 V1.5.0, it was agreed that the actual resources used for R-PDCCH transmission within the semi-statically assigned PRBs may vary dynamically between sub-frames 15. As a result, it seems necessary that the relay stations 7 will have to perform a number of blind decodings of the R-PDCCH, in order to find out the actual PRBs used for R-PDCCH transmission for that relay station 7 within the semi-statically assigned PRBs in each backhaul sub-frame 15-B. The way in which such blind decoding is performed will be apparent to those skilled in the art and further details can be found from the 3GPP standards documentation. In summary, however, the relay station will perform a blind decoding by collecting the data from the PRBs, demodulating the data, de-rate-matching, convolutional decoding, computing the CRC and masking with the Relay ID. Only if the PRBs carry data for the relay station will the blind decoding output a useful result. Otherwise the decoding will fail and the output will be meaningless.

When carrying out the blind decodings, each relay station 7 will try different combinations of PRBs in each attempt within the semi-statically assigned PRBs. It is not desirable that the relay stations 7 try all possible combinations of PRBs as this increases complexity and decoding delay. In order to reduce the blind decoding search space, the semi-statically assigned PRBs can be divided into groups or subsets and the relay stations 7 attempt the blind decodings based on the PRBs in the groups/subsets. This will be explained by way of example in the following:

In Case of Frequency Diversity (FD) R-PDCCH Transmission:

In this case it is proposed to use a list of predefined subsets where each subset consists of a number of the PRBs that have been semi-statically defined as being PRBs used for R-PDCCH. For example with a 5 MHz bandwidth (i.e. 25PRBs) the number of semi-statically allocated PRBs used for R-PDCCH may be set as the following eight PRBs:

PRB indices={0, 3, 6, 9, 13, 16, 19, 22}

And three subsets are defined as follows:

Subset 1, 8PRB indices {0, 3, 6, 9, 13, 16, 19, 22}

Subset 2, 4PRB indices={0, 3, 13, 16}

Subset 3, 2PRB indices={0, 13}

A relay station 7 assigned to receive its R-PDCCH data on a Frequency Diversity transmission would then perform the blind decoding firstly by trying to decode subset 1 and if that does not decode, then by trying to decode subset 2 and if that does not decode then by trying to decode subset 3. If none of the blind decodings work, then the relay station 7 concludes that the sub-frame 15-B does not have any data for it and takes no further action in respect of the current subframe 15-B. If a decoding does work, then the relay station 7 recovers the R-PDCCH data from the decoded resources and receives any user data in the R-PDSCH on the resources defined by the decoded R-PDCCH.

In Case of Frequency Selective (FS) R-PDCCH Transmission:

In this case it is proposed to define only one large subset upon which each relay station 7 can do the blind decoding satisfactorily. It is preferable that this subset is the same as the first subset (i.e. the largest subset—Subset 1) defined for the case of FD R-PDCCH transmission. For example with a 5 MHz bandwidth i.e. 25PRBs) the number of semi-statically allocated PRBs used for R-PDCCH may be set to the following eight PRBs:

PRB indices={0, 3, 6, 9, 13, 16, 19, 22}

And one subset is defined as follows:

8PRB indices {0, 3, 6, 9, 13, 16, 19, 22}

A relay station 7 assigned to receive its R-PDCCH data on a Frequency Selective transmission would then perform the blind decoding firstly by trying to decode PRB index 0 separately, then PRB index 3 etc. until the last PRB index 22. It is also possible to aggregate two PRBs or more in each sub-frame within the subset. If none of the blind decodings work, then the relay station 7 concludes that the sub-frame 15-B does not have any data for it and so it takes no further action in respect of the current sub-frame. If a decoding does work, then the relay station 7 recovers the R-PDCCH data from the decoded resources and receives any user data in the R-PDSCH on the resources defined by the decoded R-PDCCH.

As discussed above, each relay station 7 will be signaled in advanced to monitor FD or FS R-PDCCH transmissions and it will store data that defines the subsets of PRBs upon which the blind decodings are to be performed.

Figure 7:
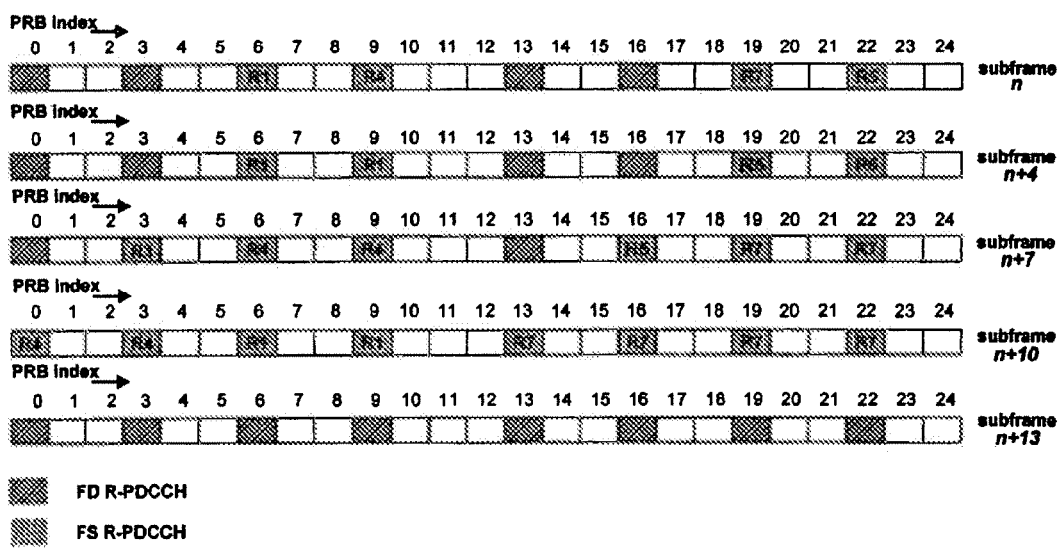
FIG. 7 schematically illustrates how R-PDCCH data for a number of different relay stations can be multiplexed together in sub-frame.

FIG. 7 shows an example of how the R-PDCCH data for different relay stations 7 can be multiplexed onto different ones of the semi-statically assigned PRBs used for carrying the R-PDCCH on FD or FS R-PDCCH transmissions. FIG. 7 also illustrates how the R-PDCCH data for different relay stations 7 can be transmitted in different sub-frames 15-B.

In particular, in this example there are ten relay stations R1 to R10 that are served by the base station 5, with relay stations R2, R3, R6, R8, R9 and R10 being semi-statically configured to receive their R-PDCCH data on FD R-PDCCH transmissions and with relay stations R1, R4, R5, R6 and R7 being semi-statically configured to receive their R-PDCCH data on FS R-PDCCH transmissions. PRBs used for FD R-PDCCH transmissions are shown with hatching and the PRBs used for FS R-PDCCH transmissions are shown with stippling. Thus in the example illustrated in FIG. 7:

1) during sub-frame n the FD relay stations R2, R3, R6, R8, R9 and R10 (or a subset of them) receive their R-PDCCH control data on the PRBs in Subset 2 defined above; whilst FS relay station R1 receives its R-PDCCH control data on PRB 6, FS relay station R4 receives its R-PDCCH control data on PRB 9, FS relay station R7 receives its R-PDCCH control data on PRB 19 and FS relay station R5 receives its R-PDCCH control data on PRB 22.

2) during sub-frame n+4 the FD relay stations R2, R3, R6, R8, R9 and R10 (or a subset of them) receive their R-PDCCH control data on the PRBs in Subset 2 defined above; whilst FS relay station R1 receives its R-PDCCH control data on PRBs 6 and 9 and FS relay station R5 receives its R-PDCCH control data on PRBs 19 and 22.

3) during sub-frame n+7 the FD relay stations R2, R3, R6, R8, R9 and R10 (or a subset of them) receive their R-PDCCH control data on the PRBs in Subset 3 defined above; whilst FS relay station R1 receives its R-PDCCH control data on PRB 3, FS relay station R4 receives its R-PDCCH control data on PRBs 6 and 9, FS relay station R5 receives its R-PDCCH control data on PRB 16 and FS relay station R7 receives its R-PDCCH control data on PRBs 19 and 22.

4) during sub-frame n+10 the FD relay stations R2, R3, R6, R8, R9 and R10 are not scheduled by the base station 5 to receive any data; whilst FS relay station R4 receives its R-PDCCH control data on PRBs 0 and 3, FS relay station R1 receives its R-PDCCH control data on PRBs 6 and 9, and FS relay station R7 receives its R-PDCCH control data on PRBs 13, 16, 19 and 22.

5) during sub-frame n+13 the FS relay stations R1, R4, R5, R6 and R7 are not scheduled by the base station 5 to receive any data; whilst FD relay stations R2, R3, R6, R8, R9 and R10 (or a subset of them) receive their R-PDCCH control data on the PRBs in Subset 1 defined above.

In this way, the base station 5 is able to vary the number of relay stations 7 and which ones that will receive R-PDCCH and user data in any given sub-frame. This facilitates the efficient use of the PRBs that have been semi-statically allocated for carrying the R-PDCCH for the different relay stations 7 served by the base station 5.

As those skilled in the art will appreciate, it is preferable that the number of PRB subsets that are defined is not too large as the number of blind decodings that the FD relay stations 7 have to perform increases with the number of subsets that are defined.

In the above example, the largest subset (Subset 1) includes all the PRBs that are semi-statically allocated for R-PDCCH transmission. However, it is possible that the number of semi-statically allocated PRBs is larger than the number of PRBs in the largest "Subset" described above. In this case, the PRBs allocated for R-PDCCH transmission can be divided into two or more smaller and distinct groups. Each relay station 7 would then be semi-statically assigned from a higher layer to one of these PRB groups. It is also possible some relay stations will be more powerful than others and can therefore carry out more complex blind decodings than others. For example some relays stations may be expected to serve many mobile devices such as in a built up urban area, whereas other relay stations in rural or domestic locations may be simpler and may only be intended to serve a few mobile devices. In this case, the simpler relay stations may be assigned to a smaller group of PRBs—so that its search space for the blind decodings is small and the more complex relay stations may be assigned to a larger group or groups of PRBs as it is capable of performing more blind decodings.

Conclusion

Among the above three options, Option 1 is the least preferred by the inventors as it can not support both FD and FS R-PDCCH transmissions in the same cell. Of the remaining two options, Option 3 is preferred by the inventors due to flexible multiplexing and co-existence of FD and FS R-PDCCH transmissions in the same backhaul sub-frame 15-B of the cell.

Base Station

Figure 8:
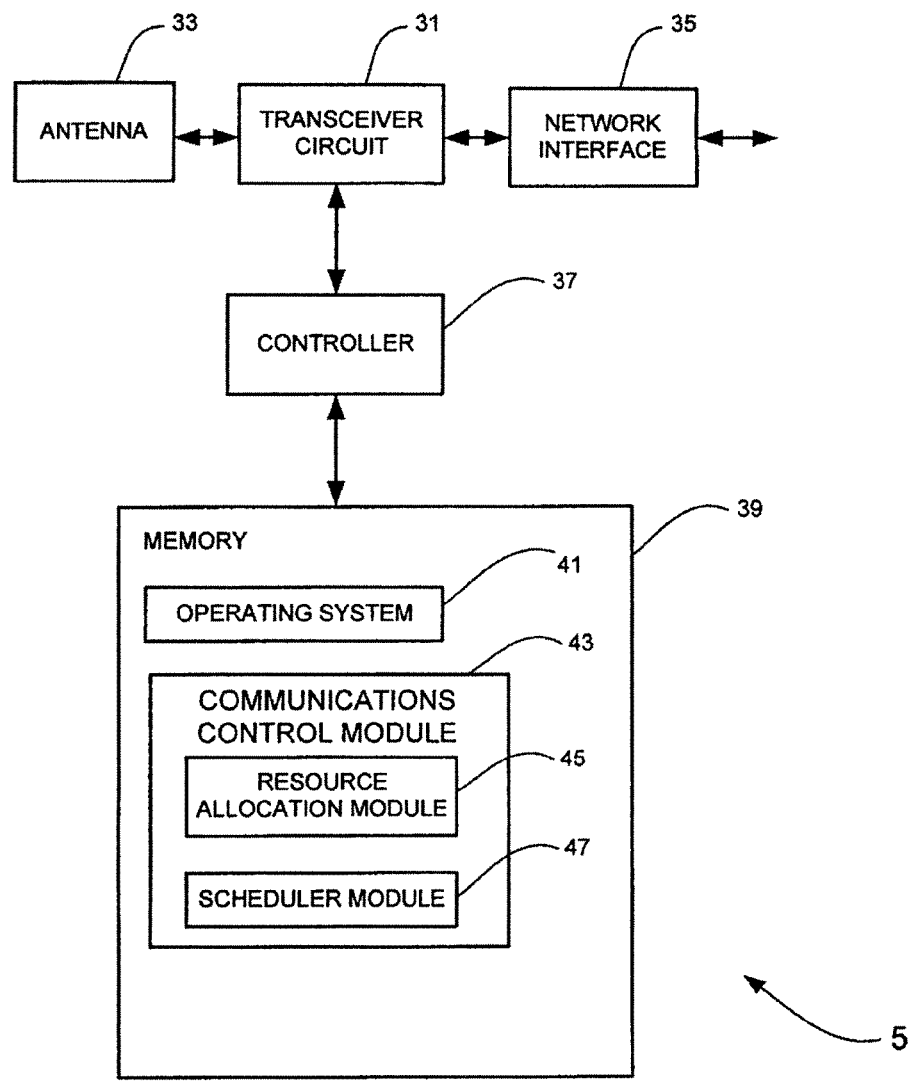
FIG. 8 is a block diagram illustrating the main components of the base station illustrated in FIG. 1.

FIG. 8 is a block diagram illustrating the main components in the base station 5 shown in FIG. 1. As shown, the base station 5 includes a transceiver circuit 31 which is operable to transmit signals to, and to receive signals from, the Direct MTs 3 and the relay stations 7 via one or more antennae 33 (using the above described sub-carriers) and which is operable to transmit signals to and to receive signals from the core network 8 via a network interface 35. The operation of the transceiver circuit 31 is controlled by a controller 37 in accordance with software stored in memory 39. The software includes, among other things, an operating system 41, a communications control module 43 having a resource allocation module 45 and a scheduler module 47. The communications control module is operable to control the generation of the sub-frames for carrying the data to the Direct MTs 3 and the relay stations 7 using the resource allocations module 45 and the scheduler module 47. The resource allocation module 45 is operable for allocating the resource blocks to be used by the transceiver circuit 31 in its communications with each of the Direct MTs 3 and with the relay stations 7, depending on the amount of data to be transmitted to those devices. The scheduler module 47 is operable to schedule the times for the transmission of the downlink data to the Direct MTs 3 and the relay stations 7. The communications control module 43 controls the generation of the appropriate R-PDCCH control data 26 for each relay station and the way that it is transmitted in the sub-frame 15-B, in the manner discussed above. The communications control module 43 also generates and signals the relevant semi-static configuration data for each relay station 7 defining, for example, whether the relay station 7 is to receive its R-PDCCH control data in an FD or FS R-PDCCH transmission; defining the semi-statically allocated PRBs to be used for R-PDCCH and any other semi-statically defined parameters (such as the above described subsets).

Relay Station

Figure 9:
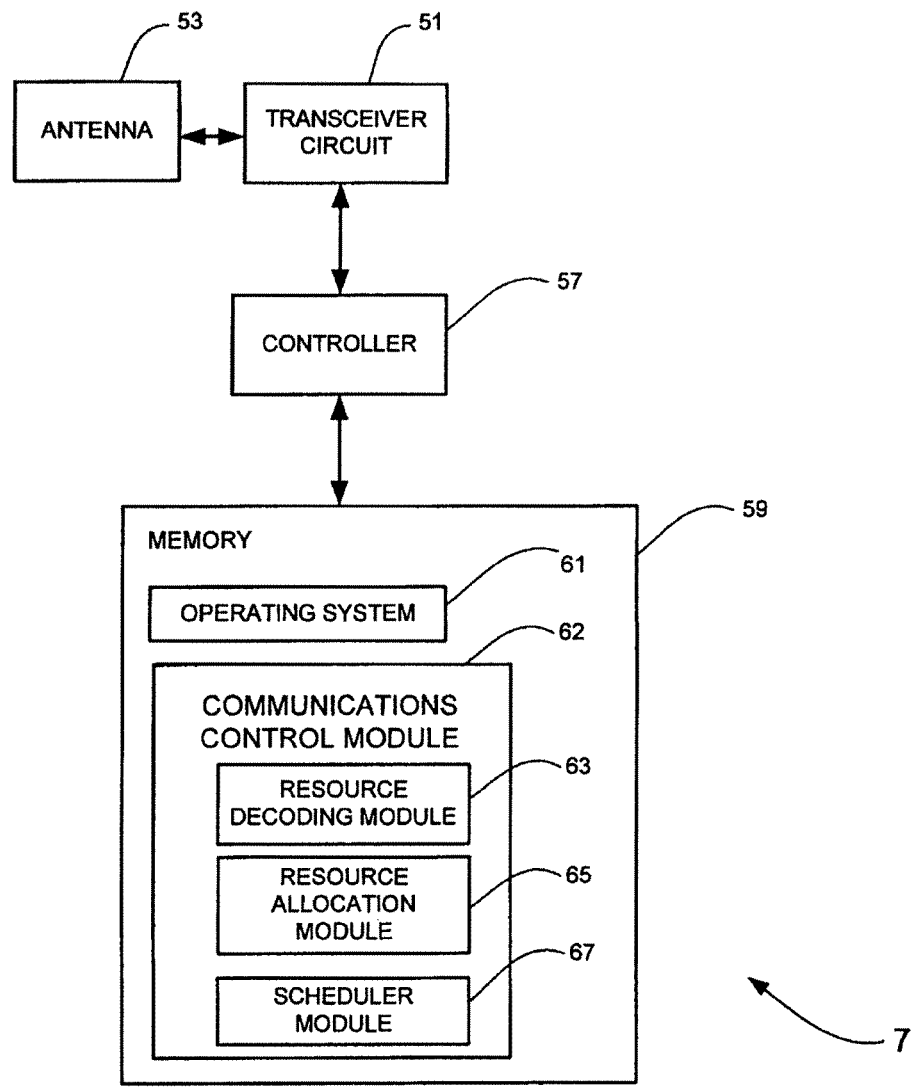
FIG. 9 is a block diagram illustrating the main components of a relay station illustrated in FIG. 1.

FIG. 9 schematically illustrates the main components of each of the relay stations 7 shown in FIG. 1. Each relay station 7 may be a fixed communications node like a base station 5 or may itself be a mobile device. Indeed, some mobile telephones 3 may provide relay services and therefore act as relay stations. As shown, each relay station 7 includes a transceiver circuit 51 which is operable to transmit signals to, and to receive signals from, Relay MTs 3 and the base station 5 via one or more antennae 53 (using the above described sub-carriers). The operation of the transceiver circuit 51 is controlled by a controller 57 in accordance with software stored in memory 59. The software includes, among other things, an operating system 61 and a communications control module 62 that includes a resource decoding module 63, a resource allocation module 65 and a scheduler module 67. The communications control module 62 is operable to generate the relay sub-frames 15-R discussed above and to generate the appropriate gaps in some of those sub-frames to allow the relay station to receive part of the sub-frames 15-B transmitted by the base station 5. The communications control module 62 is also operable to control the transceiver circuit 51 to transmit those sub-frames and then to switch the transceiver to a receive mode to receive the base station data (and then to switch the transceiver back to the transmit mode before the start of the next sub-frame). The resource decoding module 63 is operable to process (in accordance with the semi-statically defined configuration data received from the base station 5 or the core network 8) the received portion of the base station sub-frame 15-B to locate and decode its R-PDCCH control data 26 in the manner described above and, if decoded, to determine if the received base station sub-frame 15-B also includes "user" data (as opposed to control data) for that relay station 7. If it does, then the resource blocks in which that user data can be found is determined from the decoded R-PDCCH control data and the user data is then recovered from the sub-frame 15-B and stored in memory for use by the relay station 7 or for onward transmission to a Relay MT 3. The resource allocation module 65 is operable for allocating the resource blocks used by the transceiver circuit 51 in its communications with each of the Relay MTs 3 and with the base station 5, depending on the amount of data to be transmitted to those devices. The scheduler module 67 is operable to schedule the times for the transmission of appropriate sub-frames to relay the appropriate data to the Relay MTs 3.

In the above description, the base station 5 and the relay stations 7 are described, for ease of understanding, as having a number of discrete modules (such as the communications control, resource allocation and scheduler modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the above embodiments, MBSFN sub-frames were used for relay purposes. As those skilled in the art will appreciate, this is not essential and as other types of sub-frames may be used.

In the above embodiments, the relay station received data from the base station and relayed it to the Relay MTs. As those skilled in the art will appreciate, the relay station may relay the received data to one or more other relay stations, before the data reaches its destination. In this case, the first relay station would generate a sub-frame that included relay control data in the user data part of the sub-frame (i.e. in the PDSCH)—so that the subsequent relay station can recover the relay control data in a similar manner to that described above.

In the above embodiment, the base station transmitted PDCCH control data for a number of relay stations within the same sub-frame. As those skilled in the art will appreciate, the number of relay stations that will receive relay control data within a sub-frame may be varied and the above embodiments have been described by way of example only.

In the embodiments described above, the mobile telephone, the relay station and the base station will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 Introduction

Prior current RAN1#59B is meeting, an e-mail discussion was re-initiated to discuss the open issues of the Relay Type 1 backhaul design. One of the open issues is the R-PDCCH multiplexing comprising Interleaving, R-PDCCH placement in frequency domain and R-PDCCH region size in time domain.

It is our views that the deployment scenarios at the early stage of Rel' 10 will be mainly based on fixed relay nodes, and for further deployments at the later stages, mobile relay will also be employed. Therefore, it is important to clarify the necessity of supporting both frequency diversity R-PDCCH transmission for mobile relays and frequency selective R-PDCCH transmissions for fixed relays in the backhaul subframe of the cell and their impact on the choice of the open issues such as interleaving and R-PDCCH placement in frequency domain.

This contribution provides motivation and methods of supporting both frequency diversity and frequency selective R-PDCCH transmissions in the system (e.g. same donor eNB).

2 R-PDCCH Multiplexing Issues

The open issues of R-PDCCH multiplexing comprise R-PDCCH region size in time domain, R-PDCCH placement in frequency domain and Interleaving.

For R-PDCCH region size in time domain, the discussion points remain as in our earlier contribution [5] in RAN1#58B is relating FDM and TDM+FDM multiplexing schemes. In terms of flexibility for resource and power sharing between R-PDCCH and Rel'8 UE's PDSCH, it seems that FDM scheme is more flexible and simpler.

Therefore, our preference is FDM multiplexing scheme. We also see no reason to exclude the TDM+FDM multiplexing scheme by flexibly allocating the last OFDM symbol for R-PDCCH transmission in the cell.

For R-PDCCH placement in frequency domain, we think that there are three possible options described below.

A) Distributed placement where the R-PDCCH for a particular relay is distributed on two or more well-separated PRBs which may be shared by more than one relay. This option achieves frequency diversity gain.

B) Localised placement where the R-PDCCH for a particular relay is placed on contiguous or very close PRBs which are not shared by other relays. This option achieves frequency selective gain.

C) Both distributed and localised placements of the R-PDCCH transmission.

Our preference is that both distributed and localised placements of the R-PDCCH transmission are supported (i.e. option C), and we will discuss the motivation of that in the coming sections.

We note that on the R-PDCCH region point of view (i.e. semi-statically assigned PRBs), we prefer that the R-PDCCH region is distributed in frequency domain as a baseline for all options achieving their frequency diversity gain and frequency selective gain.

For Interleaving, we think that there are three possible options of:

a) Full interleaving where all R-PDCCHs for different relays are interleaved together in the current backhaul subframe. The unit size of interleaving can be resource-element group (REG) similar to Rel'8 PDCCH interleaving or control channel element (CCE).

b) No interleaving where all R-PDCCHs for different relays are not interleaved in the current backhaul subframe.

c) Mixed case of interleaving and no-interleaving where some R-PDCCHs for different relays are interleaved together and some R-PDCCHs for other relays are not interleaved.

Our preference is to support "mixed case of interleaving and no-interleaving" (i.e. option c), and we will discuss the motivation of that in the coming sections.

3 Frequency Diversity R-PDCCH Transmission

Figure 10:
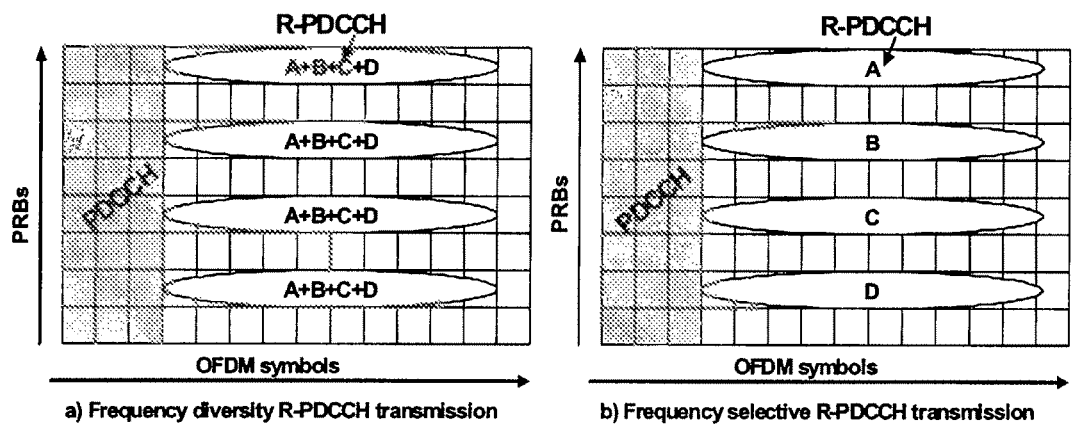
FIG. 10 is examples of FD and FS R-PDCCH transmissions. (A-D means each Relay, "+" means being interleaved)

In Frequency diversity (FD) R-PDCCH transmission, the R-PDCCHs for different relays are multiplexed and interleaved and mapped to all or subset of semi-statically assigned PRBs for R-PDCCH transmission shown on FIG. 10$a$ as A+B+C+D below. It is the case of selecting option A) for R-PDCCH placement in frequency domain and option a) for Interleaving described in the previous section 2. The main motivation is to achieve robustness against interference and channel fluctuations. This FD R-PDCCH transmission has the following characteristics:

PRBs semi-statically assigned to R-PDCCH transmission are shared by some or all relays.

All interleaved resources (PRBs) for FD R-PDCCH transmission are occupied even if the number of Relays is small.

Precoding/beamforming can't be applied for FD R-PDCCH transmission.

Allocated PRBs are well-separated (i.e. frequency distributed) to achieve frequency diversity gain.

Common RS (CRS) can be used to demodulate the FD R-PDCCH.

Dynamic selection of PRBs (i.e. number of PRBs and placement in frequency domain) for FD R-PDCCH transmission is possible in each subframe.

This is suitable for both fixed and mobile relays.

4 Frequency Selective R-PDCCH Transmission

The Frequency selective (FS) R-PDCCH transmission is the case selecting of option B) for R-PDCCH placement in frequency domain and option b) for Interleaving described in the previous section 2. It is based on the feedback from the Relay (CQI, etc.). The motivation is to achieve frequency selective gain by placing each Relay's R-PDCCH on the PRBs with good channel conditions within the semi-statically assigned PRBs for R-PDCCH transmission shown on FIG. 10b as A, B, C, D below. This FS R-PDCCH transmission has the following characteristics:
- PRBs assigned to each relay are not shared with other relays.
- The resources (PRBs) not used for FS R-PDCCH transmission can be reused for R-PDSCH and Rel'8 UE's PDSCH transmission particularly if the number of Relays is small.
- CQI feedback is used to select the best PRBs from the semi-statically assigned
- PRBs for FS R-PDCCH transmission.
- Precoding/beamforming can be applied for FS R-PDCCH transmission.
- Common RS (CRS) or Precoded DM-RS can be used to demodulate the FS R-PDCCH.
- Allocated PRBs can be contiguous or separated.
- Dynamic selection of PRBs (i.e. number of PRBs placement in frequency domain) for FS R-PDCCH transmission is possible in each subframe.
- This is mainly suitable for fixed relays and mobile relays with low mobility.

As mentioned in section 1, we think that the deployment scenarios at the initial stage of Rel' 10 will be mainly based on fixed relay nodes, so the Frequency selective (FS) R-PDCCH transmission will have some feasibility.

TABLE 2

Summary of characteristics for FS and FD R-PDCCH transmissions

| Characteristics | Frequency selective R-PDCCH transmission | Frequency diversity R-PDCCH transmission |
|---|---|---|
| One PRB shared by more than one Relay Node (Interleaved together or not) | No | Yes |
| Flexibility for sharing between R-PDCCH and R-PDSCH/Rel'8 UE's PDSCH | High (Pros.) | Low (Cons.) |
| CQI feedback is necessary to select the best PRBs for R-PDCCH transmission | Yes | No |
| R-PDCCH precoding/beamforming is possible | Yes (Pros.) | No (Cons.) |
| Dynamic selection of PRBs for R-PDCCH transmission | Yes | Yes |
| Suitable for | Fixed relays and mobile relays with low mobility (Cons.) | Both fixed and mobile relays (Pros.) |

5 How to Support both FD and FS R-PDCCH Transmissions in the System

As discussed in section 3 and 4 above, both FD and FS R-PDCCH transmissions exhibit characteristics that are important for reliable reception of the R-PDCCH for mobile and fixed relays. Therefore, from L1 perspective, it is preferable both FD and FS R-PDCCH transmissions to be supported at early stage of the Relay specification development. So we prefer the option C) for R-PDCCH placement in frequency domain and option c) for Interleaving described in the previous section 2. Next, we discuss possible options for supporting both FD and FS R-PDCCH transmissions in the system (e.g. same donor eNB).

Option 1:
Frequency diversity R-PDCCH and Frequency selective R-PDCCH transmissions are not supported in the same cell. For example, in the low mobility areas or for fixed relays, only Frequency selective R-PDCCH is supported and in the high mobility areas, only Frequency diversity R-PDCCH transmission is supported in the cell.
- Small impact for the specification. For example, in cell specific mapping, 1 bit can be added in the system information.
- No flexibility for co-existence of Frequency diversity R-PDCCH and
- Frequency selective R-PDCCH transmissions in the cell.

Option 2:
Both Frequency diversity R-PDCCH and Frequency selective R-PDCCH transmissions are supported in the same cell, but not in the same subframe.
- eNB will apply TDM multiplexing into different subframes for Frequency diversity and Frequency selective R-PDCCH transmissions.
- Relay will be informed from higher layers in semi-static manner about which of these two R-PDCCH transmissions to monitor.
- Relay will monitor its R-PDCCH in all the backhaul subframes regardless whether the subframe carries the Frequency diversity R-PDCCH and Frequency selective R-PDCCH and if it is not scheduled the decoding will fail anyway.

Figure 11:
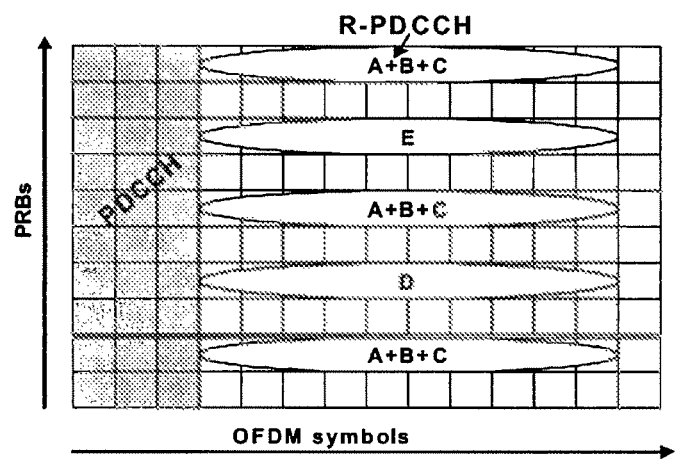
FIG. 11 is an example of co-existence of FD and FS R-PDCCH transmissions in the same sub-frame. (A-E means each Relay, "+" means being interleaved)

Option 3:
Both Frequency diversity and Frequency selective R-PDCCH transmissions are supported in the same cell and in the same subframe as shown on FIG. 11 below.
- eNB will use FDM multiplexing in the same subframe and TDM multiplexing into different subframes for Frequency diversity R-PDCCH and Frequency selective R-PDCCH transmissions.
- Same as Option 2, Relay will be informed from higher layers in semi-static manner about which of these two R-PDCCH transmissions to monitor.
- Relay will monitor its R-PDCCH in all the backhaul subframes and if it is not scheduled the decoding will fail anyway.

Among above three options, Option 1 is least preferred as it can not support both FD and FS R-PDCCH transmissions in the same cell. From the remaining two options, Option 3 is preferable due to flexible multiplexing and co-existence of FD and FS R-PDCCH transmissions in the same backhaul subframe of the cell.

6 Conclusion

In this contribution, we have discussed the motivation and methods of supporting both frequency diversity and frequency selective R-PDCCH transmissions in the system (e.g. same donor eNB). The following three methods/options were identified:

Option 1:
Frequency diversity R-PDCCH and Frequency selective R-PDCCH transmissions are not supported in the same cell.

Option 2:
Both Frequency diversity R-PDCCH and Frequency selective R-PDCCH transmissions are supported in the same cell, but not in the same subframe.
- eNB will apply TDM multiplexing into different subframes for Frequency diversity and Frequency selective R-PDCCH transmissions.

Option 3:
Both Frequency diversity and Frequency selective R-PDCCH transmissions are supported in the same subframe and in the same cell.
- eNB will use FDM multiplexing in the same subframe and TDM multiplexing into different subframes for Frequency diversity R-PDCCH and Frequency selective R-PDCCH transmissions.

We propose to support both Frequency diversity R-PDCCH and Frequency selective R-PDCCH transmissions in the same subframe and in the same cell (i.e. Option 3) due to flexible multiplexing.

7 References
1) TR 36.814V1.5.0
2) R1-092249, "Text proposal on backhaul resource assignment", Nokia, Nokia Siemens Networks, Ericsson, Motorola, RIM, TI, NEC, Samsung, Huawei, CATT, LGE, CMCC, Qualcomm, ZTE.
3) R1-092969, "Type 1 backhaul link", Ericsson, NEC, Samsung, Motorola, Panasonic, RIM, LGE, Nokia, Nokia Siemens Networks, Qualcomm, Huawei, Alcatel-Lucent, CATT, Texas Instruments.
4) R1-092965, "Control Structure for Relay Type 1 nodes", NEC group.
5) R1-093863, "Issues on Relay type 1 control design", NEC group.
6) R1-094517, "Control signalling placement design for relay nodes", Panasonic
7) R1-095088, "Summary of email discussion on Type 1 Relay backhaul design issues", Panasonic.

This application is based upon and claims the benefit of priority from United Kingdom patent application No. 1000449.7, filed on Jan. 12, 2010, the disclosure of which is incorporated herein in its entirety by reference.

The invention claimed is:

1. A communication station which communicates with a plurality of relay stations, the communication station comprising:
   a transceiver circuit; and
   a communications control module comprising a memory and a processor which executes operations based on code stored in the memory, the operations comprising selecting one of a first control signal transmission scheme and a second control signal transmission scheme;
   wherein, the transceiver circuit is configured to transmit control signals, to at least two relay stations of the plurality of relay stations, wherein the control signals are interleaved on at least one Physical Resource Block (PRB), when the communications control module selects the first control signal transmission scheme;
   wherein, the transceiver circuit is further configured to transmit a control signal to at least one relay station of the plurality of relay stations, in a non-interleaved manner on at least one PRB, when the communications control module selects the second control signal transmission scheme; and
   wherein the transceiver circuit is further configured to transmit first configuration data defining at least one first subframe configured for transmission of control signals from the communication station to at least one relay station, and the transceiver circuit is further configured to transmit second configuration data defining at least one second subframe configured to transmission of control signals from the communication station to at least one relay station.

2. The communications station according to claim 1, wherein the communications station is an evolved Node B.

3. The communications station according to claim 1, wherein the transceiver circuit is further configured to transmit the control signals on a Relay Physical Downlink Control CHannel (R-PDCCH).

4. The communications station according to claim 1, wherein the plurality of relay stations comprises at least a first group of relay stations and a second group of relay stations, different from the first group of relay stations, and the transceiver circuit is configured to transmit controls signals for the first group of relay stations in sub-frames different from sub-frames in which control signals for the second group of relay stations are transmitted.

5. A relay station which communicates with a communication station, the relay station comprising:
   a transceiver circuit; and
   a communications control module comprising a memory and a processor which executes operations based on code stored in the memory, the operations comprising selecting one of a first control signal transmission scheme and a second control signal transmission scheme;
   wherein, the transceiver circuit is configured to receive, from the communication station, control signals, wherein the control signals are interleaved on at least one Physical Resource Block (PRB), when the communications control module selects the first control signal transmission scheme;
   wherein, the transceiver circuit is further configured to receive a control signal from the communication station, in a non-interleaved manner on at least one PRB, when the communications control module selects the second control signal transmission scheme;
   wherein the transceiver circuit is further configured to receive, from the communication station, first configuration data defining a first at least one subframe configured for transmission of control signals, and second configuration data defining a second at least one subframe configured for transmission of control signals; and
   wherein the communications control module is operable to reconfigure the relay station in accordance with one of the first configuration data and the second configuration data.

6. The relay station according to claim 5, wherein the communications station is an evolved Node B.

7. The relay station according to claim 5, wherein the transceiver circuit is configured to receive the control signal on a Relay Physical Downlink Control CHannel (R-PDCCH).

8. A communication method of a communication station which communicates with a plurality of relay stations, the method comprising:
   selecting one of a first control signal transmission scheme and a second control signal transmission scheme;
   transmitting control signals, to at least two relay stations of the plurality of relay stations, wherein the control signals are interleaved on at least one Physical Resource Block (PRB), when the first control signal transmission scheme is selected;
   transmitting a control signal to at least one relay station of the plurality of relay stations, in a non-interleaved manner on at least one PRB, when the second control signal transmission scheme is selected;
   transmitting first configuration data defining at least one first subframe configured for transmission of control signals from the communication station to at least one relay station; and
   transmitting second configuration data defining at least one second subframe configured for transmission of control signals from the communication station to at least one relay station.

9. The method according to claim 8, wherein the communications station is an evolved Node B.

10. The method according to claim 8, wherein the transmitting the control signals comprises transmitting the control signals on a Relay Physical Downlink Control CHannel (R-PDCCH).

11. The method according to claim 8, wherein the plurality of relay stations comprises at least a first group of relay stations and a second group of relay stations, different from the first group of relay stations, and the transmitting the control signals when the first control signal transmission scheme is selected and the transmitting the control signal when the second control signal transmission scheme is selected comprises transmitting controls signals for the first group of relay stations in sub-frames different from sub-frames in which control signals for the second group of relay stations are transmitted.

12. A communication method of a relay node which communicates with a communication station, the method comprising:

selecting one of a first control signal transmission scheme and a second control signal transmission scheme;

receiving, from the communication station, control signals, wherein the control signals are interleaved on at least one Physical Resource Block (PRB), when the first control signal transmission scheme is selected;

receiving a control signal from the communications station in a non-interleaved manner on at least one PRB, when the second control signal transmission scheme is selected;

receiving, from the communication station, first configuration data defining a first at least one subframe configured for transmission of control signals, and second configuration data defining a second at least one subframe configured for transmission of control signals; and reconfiguring the relay node in accordance with one of the first configuration data and the second configuration data.

13. The method according to claim 12, wherein the communications station is an evolved Node B.

14. The method according to claim 12, wherein the receiving the control signal comprises receiving the control signal on a Relay Physical Downlink Control CHannel (R-PDCCH).

* * * * *